June 7, 1938.　　　S. E. BAUGHMAN　　　2,120,169
MATERIAL DISTRIBUTOR OR SPREADER
Filed March 1, 1937　　　2 Sheets-Sheet 1

Samuel E. Baughman, INVENTOR
BY Victor J. Evans & Co.
ATTORNEYS

June 7, 1938.　　　　S. E. BAUGHMAN　　　　2,120,169
MATERIAL DISTRIBUTOR OR SPREADER
Filed March 1, 1937　　　2 Sheets-Sheet 2

Samuel E. Baughman, INVENTOR
BY Victor J. Evans & Co.
ATTORNEYS

Patented June 7, 1938

2,120,169

UNITED STATES PATENT OFFICE 2,120,169

MATERIAL DISTRIBUTOR OR SPREADER

Samuel E. Baughman, Broadwell, Ill.

Application March 1, 1937, Serial No. 128,535

1 Claim. (Cl. 275—8)

The invention relates to a material distributor or spreader and more especially to a vehicular limestone distributor or spreader.

The primary object of the invention is the provision of a distributor or spreader of this character, wherein material such as limestone can be distributed and spread upon the ground on the advancement of such distributor or spreader and in this manner considerable acreage can be covered in the least possible time, the distributor or spreader being of novel construction.

Another object of the invention is the provision of a distributor or spreader of this character, wherein the material is carried in a single way onto a conveyor which directly delivers such material therefrom to a rotary spreader disk so that the material will be delivered through centrifugal action for deposit on the ground uniformly and expeditiously.

A further object of the invention is the provision of a distributor or spreader of this character, which is comparatively simple in its construction, thoroughly reliable and efficient in its operation, positive in action, vehicular in kind, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings.

Similar reference characters indicate corresponding parts throughout the several views in the drawings.

Figure 1:
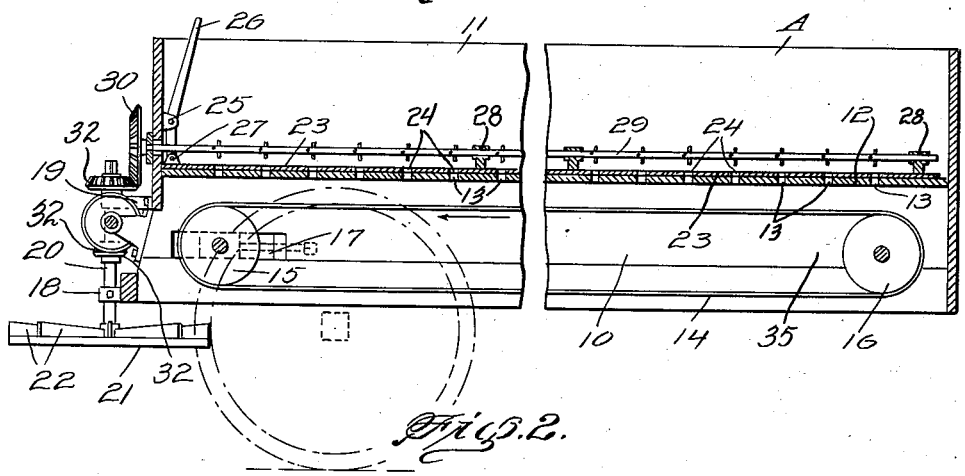
Figure 1 is a vertical longitudinal sectional view through a distributor or spreader constructed in accordance with the invention.
Figure 2:
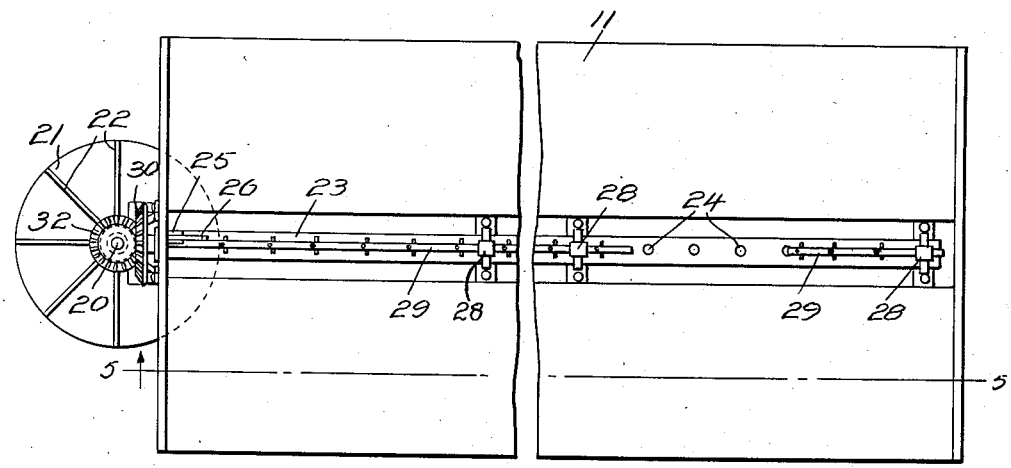
Figure 2 is a top plan view thereof.
Figure 6:
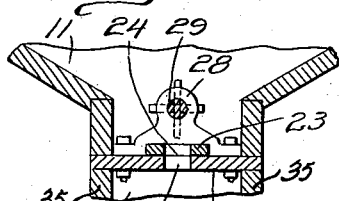
Figure 6 is a fragmentary enlarged vertical transverse sectional view corresponding to Figure 3.
Figure 3:
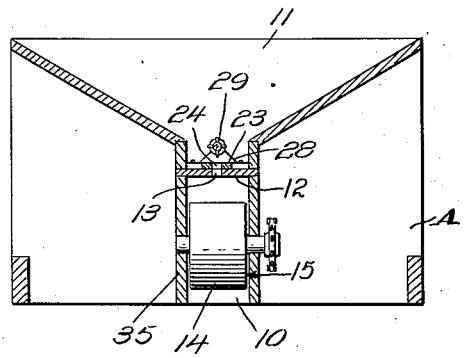
Figure 3 is a vertical transverse sectional view through the same.
Figure 4:
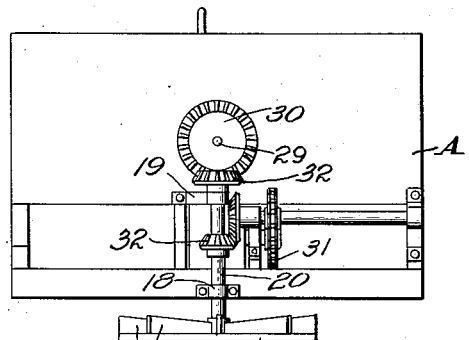
Figure 4 is an end elevation.
Figure 5:
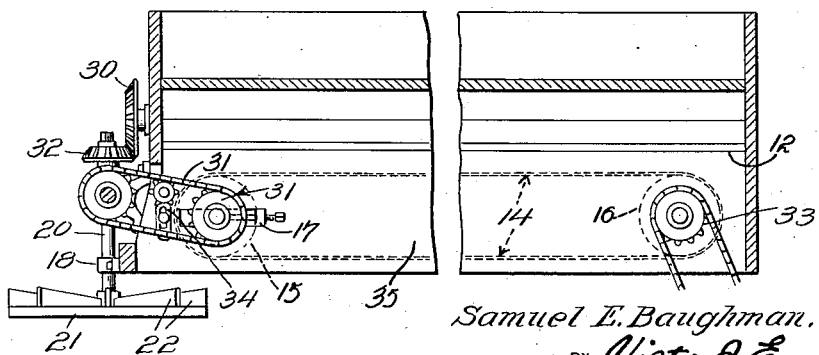
Figure 5 is a sectional view taken on the line 5—5 of Figure 2 looking in the direction of the arrow.

Referring to the drawings in detail, A designates generally a wheeled truck body built with a longitudinally centered feed way 10 and a hopper 11, respectively, these being coextensive with the length of said body A while arranged between the said feed way and the hopper is a horizontally disposed flooring 12 having at intervals therein holes 13 for establishing communication between the feed way 10 and the said hopper 11.

In this feed way 10 is arranged an endless conveyor 14 supported upon rollers 15 and 16, respectively, suitably journaled in the said body. Associated with the roller 15 is a suitable tightening device 17 for the conveyor 14, the latter extending throughout the major length of the feed way 10.

At one end of the body A and aligned with the conveyor 14 are bearings 18 and 19, respectively, in which is journaled a vertical driving shaft 20 having fixed to its lower end a spreader disk or head 21 upon which is deposited at its upper side material from the conveyor 14. This upper side of the disk carries radial fins 22 functioning as blades for the spreading of the material therefrom under centrifugal action during the rotation of the head or disk in the operation of the machine.

Superimposed upon the flooring 12 is a slide gate 23 having openings 24 for registering with the openings 13 and such gate 23 controls the feed of material such as limestone within the hopper 11 onto the conveyor 14 for distribution and spreading of such material in the operation of the machine. Arranged at one end of the body A and pivoted at 25 is an actuator lever 26 which is also pivotally connected at 27 with the gate for the sliding thereof to regulate and control the feed of material from the hopper 11 into the feed way 10 onto the conveyor 14, this lever 26 being manually controlled.

Saddling the gate 23 at determined intervals and fixed to the flooring 12 are brackets 28 forming bearings for an agitator shaft 29 which is arranged longitudinally of the body A at the proper elevation above said gate and this shaft through gearing 30 is driven from the shaft 20 while through the chain and sprocket connections 31 and gearing 32, respectively, between the roller 15 and the shaft 20 the latter is driven in that the roller 16 through chain and sprocket connections 33 is operated from the driving wheels (not shown) as supporting the body A of the machine. The connections 31 have in association therewith a tightener device 34.

The head or disk 21 is arranged horizontally in a plane below the plane of the lowermost stretch of the conveyor 14 and is so located to directly receive material from this conveyor so that such material can be distributed and spread in the rotation of the head or disk as the machine is advanced over the ground.

The feed way 10 is defined by spaced opposed vertical walls 35 which at their upper edges are joined with the boarding defining the hopper 11 and this feed way 10 throughout the bottom thereof is open, the conveyor 14 being of a width slightly less than the width of the said way 10 and the material delivered through the openings 13 fall upon the upper stretch of this conveyor.

It is, of course, understood that the belt tightener 17 may be arranged with relation to either roller 15 or 16 at the option of the manufacturer and also that the lever 26 can be properly located for convenience in the manual handling thereof, these changes being contemplated within the scope of the invention and coverage by the claim hereunto appended.

What is claimed is:

A vehicular device of the kind described comprising a truck body having a longitudinally disposed hopper extending from end to end of said body with an open bottom throughout its extent, spaced vertical walls built in said body and meeting the opposite side edges of the open bottom of said hopper, a perforated flooring horizontally arranged between said spaced walls slightly below the open bottom of the hopper, bearings fixed to and rising from said flooring, an agitator having a shaft journaled in said bearings, a feed gate slidably fitting said bearings and controlling the perforations in the flooring, a spreader disk rotatably fitted at one end of the body, connections between the agitator and said disk for simultaneous operation thereof, and an endless conveyor arranged between the spaced vertical walls and the ends of the body for disposition beneath the perforated flooring and adapted to deliver material flowing through said perforations in the flooring onto the disk, the said conveyor in its disposition being partly extended over the disk and slightly elevated therefrom.

SAMUEL E. BAUGHMAN.